(12) United States Patent
Jayana et al.

(10) Patent No.: US 12,497,898 B2
(45) Date of Patent: Dec. 16, 2025

(54) TURBINE BLADE TIP SHROUD WITH AXIALLY OFFSET CUTTER TEETH, AND RELATED SURFACE PROFILES AND METHOD

(71) Applicant: General Electric Company, Schenectady, NY (US)

(72) Inventors: Srinivasa Govardhan Jayana, Bangalore (IN); Richard Ryan Pilson, Greer, SC (US); William Scott Zemitis, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 35 days.

(21) Appl. No.: 18/379,433

(22) Filed: Oct. 12, 2023

(65) Prior Publication Data

US 2024/0159154 A1    May 16, 2024

Related U.S. Application Data

(62) Division of application No. 17/691,377, filed on Mar. 10, 2022, now Pat. No. 11,821,336.

(Continued)

(51) Int. Cl.
*F01D 5/22* (2006.01)
*F01D 5/00* (2006.01)
*F01D 5/14* (2006.01)

(52) U.S. Cl.
CPC ............. *F01D 5/225* (2013.01); *F01D 5/005* (2013.01); *F01D 5/141* (2013.01); *F01D 5/143* (2013.01);

(Continued)

(58) Field of Classification Search
CPC .......... F01D 5/225; F01D 5/005; F01D 5/141; F01D 5/143; F01D 11/127;
(Continued)

(56) References Cited

U.S. PATENT DOCUMENTS 6,722,852 B1    4/2004  Wedlake et al.
6,805,530 B1 *  10/2004 Urban ................... F01D 11/125
                                                        415/174.4

(Continued)

OTHER PUBLICATIONS

International Preliminary Report on Patentability dated Nov. 27, 2023 for PCT/US2022/071630 filed Apr. 8, 2022; pp. 7.

(Continued)

*Primary Examiner* — Ryan J. Walters
(74) *Attorney, Agent, or Firm* — Charlotte Wilson; James Pemrick; Hoffman Warnick LLC

(57) ABSTRACT

A turbine blade tip shroud has a first cutter tooth extending from a tip rail from one of the upstream side and the downstream side of the tip rail and adjacent the leading edge of the body. The tip shroud also includes a second cutter tooth extending from the tip rail from the other side of the tip rail at a position axially distant from the first cutter tooth. The cutter teeth are thus axially offset. The tip shroud can be initially manufactured with this shape or may be modified from a used tip shroud having, for example, opposing cutter teeth near a leading edge of a body of the tip shroud. Various tip shroud surface profiles, which are expressed in terms of Cartesian coordinates, are also provided.

6 Claims, 9 Drawing Sheets

Related U.S. Application Data

(60) Provisional application No. 63/172,777, filed on Apr. 9, 2021.

(52) U.S. Cl.
CPC .. *F05D 2220/30* (2013.01); *F05D 2220/3213* (2013.01); *F05D 2230/80* (2013.01); *F05D 2240/30* (2013.01); *F05D 2250/74* (2013.01)

(58) Field of Classification Search
CPC ......... F05D 2220/30; F05D 2220/3213; F05D 2230/80; F05D 2240/30; F05D 2250/74; F05D 2230/14; F05D 2230/30; F05D 2250/73

See application file for complete search history.

(56) References Cited

U.S. PATENT DOCUMENTS

| | | | |
|---|---|---|---|
| 6,851,931 B1* | 2/2005 | Tomberg | F01D 5/147 |
| | | | 415/173.1 |
| 6,913,445 B1* | 7/2005 | Beddard | F01D 5/225 |
| | | | 415/173.6 |
| 7,001,144 B2* | 2/2006 | Urban | F01D 5/225 |
| | | | 415/173.1 |
| 7,094,023 B2* | 8/2006 | Dube | F01D 5/225 |
| | | | 415/173.1 |
| 7,094,032 B2* | 8/2006 | Seleski | F01D 11/08 |
| | | | 415/173.6 |
| 7,273,353 B2* | 9/2007 | Dube | F01D 5/225 |
| | | | 415/173.6 |
| 7,887,295 B2 | 2/2011 | Brittingham et al. | |
| 8,057,186 B2 | 11/2011 | Brittingham | |
| 8,192,166 B2 | 6/2012 | Beeck et al. | |
| 9,009,965 B2* | 4/2015 | Tragesser | F01D 5/225 |
| | | | 29/889.1 |
| 10,513,934 B2* | 12/2019 | Zemitis | F01D 5/225 |
| 10,526,900 B2* | 1/2020 | Tham | F01D 11/08 |
| 11,236,620 B1 | 2/2022 | Zemitis et al. | |
| 11,371,363 B1 | 6/2022 | Gutta et al. | |
| 11,821,336 B2* | 11/2023 | Jayana | F01D 5/141 |
| 2004/0223849 A1 | 11/2004 | Urban | |
| 2005/0120555 A1 | 6/2005 | Boudereau et al. | |
| 2005/0129519 A1* | 6/2005 | Beddard | F01D 5/225 |
| | | | 416/192 |
| 2005/0191182 A1 | 9/2005 | Seleski | |
| 2008/0075600 A1 | 3/2008 | Moors et al. | |
| 2008/0292466 A1 | 11/2008 | Tragesser et al. | |
| 2009/0053047 A1 | 2/2009 | Chiurato et al. | |
| 2014/0003948 A1 | 1/2014 | Dubs et al. | |
| 2018/0202298 A1 | 7/2018 | Zemitis et al. | |
| 2019/0292914 A1 | 9/2019 | Zemitis et al. | |
| 2022/0307376 A1 | 9/2022 | Tan et al. | |
| 2022/0325629 A1 | 10/2022 | Tan et al. | |

OTHER PUBLICATIONS

Restriction Requirement dated Sep. 2, 2022 for U.S. Appl. No. 17/691,377, filed Mar. 10, 2022; pp. 7.
Restriction Response filed Nov. 2, 2022 for U.S. Appl. No. 17/691,377, filed Mar. 10, 2022; pp. 9.
Non Final Office Action dated Dec. 8, 2022 for U.S. Appl. No. 17/691,377, filed Mar. 10, 2022; pp. 23.
Response to Non Final Office Action filed Mar. 7, 2023 for U.S. Appl. No. 17/691,377, filed Mar. 10, 2022; pp. 11.
Final Office Action dated Apr. 19, 2023 for U.S. Appl. No. 17/691,377, filed Mar. 10, 2022; pp. 15.
Response to Final Office Action filed Jun. 16, 2023 for U.S. Appl. No. 17/691,377, filed Mar. 10, 2022; pp. 6.
Notice of Allowance and Fee(s) Due dated Jul. 12, 2023 for U.S. Appl. No. 17/691,377, filed Mar. 10, 2022; pp. 6.
Supplementary Partial European Search Report dated Oct. 14, 2024 for EP Patent Application No. 22785659.8 filed Apr. 8, 2022; pp. 26.
Supplementary European Search Report dated Jan. 9, 2025 for EP Patent Application No. 22785659.8 filed Apr. 8, 2022; pp. 23.

* cited by examiner

TURBINE BLADE TIP SHROUD WITH AXIALLY OFFSET CUTTER TEETH, AND RELATED SURFACE PROFILES AND METHOD

FIELD OF THE DISCLOSURE

The subject matter disclosed herein relates to turbomachines. More particularly, the subject matter disclosed herein relates to a turbine blade tip shroud with axially offset cutter teeth and related surface profiles for the tip shroud. A repair method for the tip shroud is also provided.

BACKGROUND OF THE DISCLOSURE

Some jet aircraft and simple or combined cycle power plant systems employ turbines, or so-called turbomachines, in their configuration and operation. Some of these turbines employ airfoils (e.g., turbine nozzles, blades, airfoils, etc.), which during operation are exposed to fluid flows. These airfoils are configured to aerodynamically interact with the fluid flows and to generate energy from these fluid flows as part of power generation. For example, the airfoils may be used to create thrust, to convert kinetic energy to mechanical energy, and/or to convert thermal energy to mechanical energy. In addition, during operation, tip shrouds on the radially outer end of the airfoils interact with stationary components to direct hot gases towards the airfoils. Due to these interactions and associated energy conversions, the aerodynamic characteristics of these tip shrouds may result in losses in system and turbine operation, performance, thrust, efficiency, reliability, and power. The interaction of the tip shroud with stationary components can also cause an imbalance in the tip shroud that can reduce the creep life of the blade and that can magnify the noted issues.

BRIEF DESCRIPTION OF THE DISCLOSURE

All aspects, examples and features mentioned below can be combined in any technically possible way.

An aspect of the disclosure provides a turbine blade tip shroud, comprising: a body configured to couple to an airfoil at a radial outer end of the airfoil, the body having a leading edge and a trailing edge opposing the leading edge; a tip rail extending radially from the body, the tip rail having an upstream side and a downstream side opposing the upstream side; and a first cutter tooth extending from the tip rail from one of the upstream side and the downstream side of the tip rail and adjacent the leading edge of the body; and a second cutter tooth extending from the tip rail from the other side of the upstream side and the downstream side of the tip rail at a position axially distant from the first cutter tooth.

Another aspect of the disclosure includes any of the preceding aspects, and the first cutter tooth extends from the upstream side of the tip rail, and the second cutter tooth extends from the downstream side of the tip rail.

Another aspect of the disclosure includes any of the preceding aspects, and the position axially distant from the first cutter tooth is in a range of 30% to 50% of an axial length of the tip rail.

An aspect of the disclosure provides a method of modifying a turbine blade tip shroud, the method comprising: removing a first cutter tooth extending from a selected side of an upstream side and a downstream side of a tip rail of the turbine blade tip shroud, the first cutter tooth opposing a second cutter tooth extending from the tip rail from the other side of the upstream side and the downstream side of the tip rail; and forming a third cutter tooth on the selected side of the upstream side and the downstream side of the tip rail at a position axially distant from the second cutter tooth.

Another aspect of the disclosure includes any of the preceding aspects, and the first cutter tooth and the second cutter tooth are adjacent a leading edge of a body of the turbine blade tip shroud.

Another aspect of the disclosure includes any of the preceding aspects, and the second cutter tooth extends from the upstream side of the tip rail, and the third cutter tooth extends from the downstream side of the tip rail.

Another aspect of the disclosure includes any of the preceding aspects, and the position axially distant from the second cutter tooth is in a range of 30% to 50% of an axial length of the tip rail.

Another aspect of the disclosure includes any of the preceding aspects, and a body of the turbine blade tip shroud includes a pair of opposed, axially extending wings, and further comprising removing a portion of at least one of the pair of opposed, axially extending wings.

Another aspect of the disclosure includes any of the preceding aspects, and the removing the portion of the at least one of the pair of opposed, axially extending wings includes rounding an edge surface thereof from a more linear edge surface profile.

Another aspect of the disclosure includes any of the preceding aspects, and the removing the portion of the at least one of the pair of opposed, axially extending wings includes forming a linear edge surface.

An aspect of the disclosure provides a turbine blade tip shroud, comprising: a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side; and a tip rail extending radially from the pair of opposed, axially extending wings, the tip rail having a downstream side, an upstream side opposing the downstream side, and a forward-most and radially outermost origin, wherein the sides of the tip rail have a shape having a nominal profile substantially in accordance with at least part of Cartesian coordinate values of X and Y set forth in TABLE I and originating at the forward-most and radially outermost origin, wherein the Cartesian coordinate values are non-dimensional values of from 0% to 100% convertible to distances by multiplying the X and Y values by an tip rail axial length expressed in units of distance, and wherein X and Y values are connected by lines to define a tip rail side surfaces profile.

Another aspect of the disclosure includes any of the preceding aspects, and the airfoil and the turbine blade tip shroud are parts of a third stage blade.

Another aspect of the disclosure includes any of the preceding aspects, and a leading edge surface and a trailing edge surface have a shape having a nominal profile substantially in accordance with at least part of Cartesian coordinate values of X, Y, and Z values set forth in TABLE II and originating at the forward-most and radially outermost origin, wherein the Cartesian coordinate values are non-dimensional values of from 0% to 100% convertible to distances by multiplying the values by the tip rail axial length, and wherein X, Y, and Z values are joined smoothly with one another to form a leading edge surface profile and a trailing edge surface profile.

An aspect of the disclosure provides a turbine blade tip shroud, comprising: a pair of opposed, axially extending wings configured to couple to an airfoil at a radial outer end of the airfoil, the airfoil having a pressure side and a suction side opposing the pressure side, a leading edge spanning between the pressure side and the suction side, and a trailing edge opposing the leading edge and spanning between the pressure side and the suction side; a tip rail extending radially from the pair of opposed, axially extending wings, the tip rail having a downstream side and an upstream side opposing the downstream side and a forward-most and radially outermost origin; and a leading edge surface and a trailing edge surface having a shape having a nominal profile substantially in accordance with at least part of Cartesian coordinate values of X, Y, and Z values set forth in TABLE II and originating at the forward-most and radially outermost origin, wherein the Cartesian coordinate values are non-dimensional values of from 0% to 100% convertible to distances by multiplying the values by an tip rail axial length, and wherein X, Y, and Z values are joined smoothly with one another to form a leading edge surface profile and a trailing edge surface profile.

Another aspect of the disclosure includes any of the preceding aspects, and the airfoil and the turbine blade tip shroud are parts of a third stage blade.

Another aspect of the disclosure includes any of the preceding aspects, and the sides of the tip rail have a shape having a nominal profile substantially in accordance with at least part of Cartesian coordinate values of X and Y set forth in TABLE I and originating at the forward-most and radially outermost origin, wherein the Cartesian coordinate values are non-dimensional values of from 0% to 100% convertible to distances by multiplying the X and Y values by the tip rail axial length expressed in units of distance, and wherein X and Y values are connected by lines to define a tip rail side surfaces profile.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
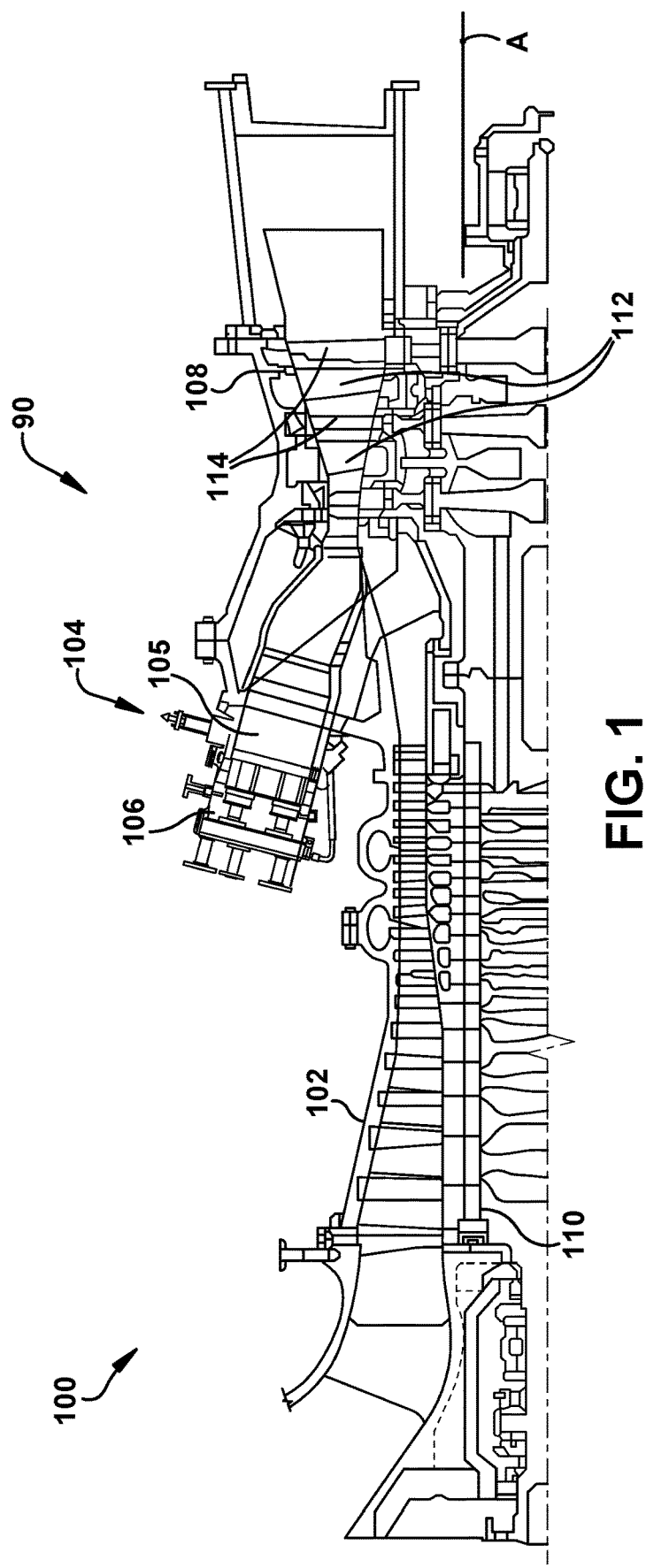
FIG. 1 shows a schematic view of an illustrative turbomachine.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION OF THE DISCLOSURE

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine and by turbine blades, or, for example, the flow of air through the combustor or coolant through one of the turbine's component systems. The term "downstream" corresponds to the direction of flow of the fluid, and the term "upstream" refers to the direction opposite to the flow. Components, such as airfoils or shrouds, positioned within the flow of fluids through a gas turbine may be described as having a "leading edge", which is the foremost edge of the component that first encounters the oncoming flow of fluids, and a "trailing edge" opposite the leading edge. The terms "forward" and "aft," without any further specificity, refer to directions, with "forward" referring to the front or compressor end of the engine, and "aft" referring to the rearward or turbine end of the engine.

It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis A, e.g., rotor shaft 110. Finally, the term "circumferential" refers to movement or position around an axis. It will be appreciated that such terms may be applied in relation to the center axis of the turbine.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur and that the description includes instances where the event occurs and instances where it does not.

Where an element or layer is referred to as being "on," "engaged to," "connected to," or "coupled to" another element or layer, it may be directly on, engaged to, connected to or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Various aspects of the disclosure are directed toward a turbine blade tip shroud having a first cutter tooth extending from a tip rail from one of the upstream side and the downstream side of the tip rail and positioned adjacent the leading edge of the body. The tip shroud also includes a second cutter tooth extending from the tip rail from the other side of the upstream side and the downstream side of the tip rail at a position axially distant from the first cutter tooth. The tip shroud can be initially manufactured with this shape. Alternatively, according to a method of modifying described herein, a tip shroud can be modified to have opposing cutter teeth near a leading edge of a body of the tip shroud.

Aspects of the disclosure may also include tip shroud surface profiles expressed in terms of Cartesian coordinates. The tip rail includes a forward-most and radially outermost origin that acts as a reference point for surface profiles of sides of the tip rail, i.e., upstream and downstream sides thereof, and for a leading edge surface profile and a trailing edge surface profile of the tip shroud, as described herein. The surface profiles are stated as shapes having a nominal profile substantially in accordance with at least part of Cartesian coordinate values of X and Y, and perhaps Z, set forth in a respective table. The Cartesian coordinates originate at the forward-most and radially outermost origin of the tip rail.

Figure 4:
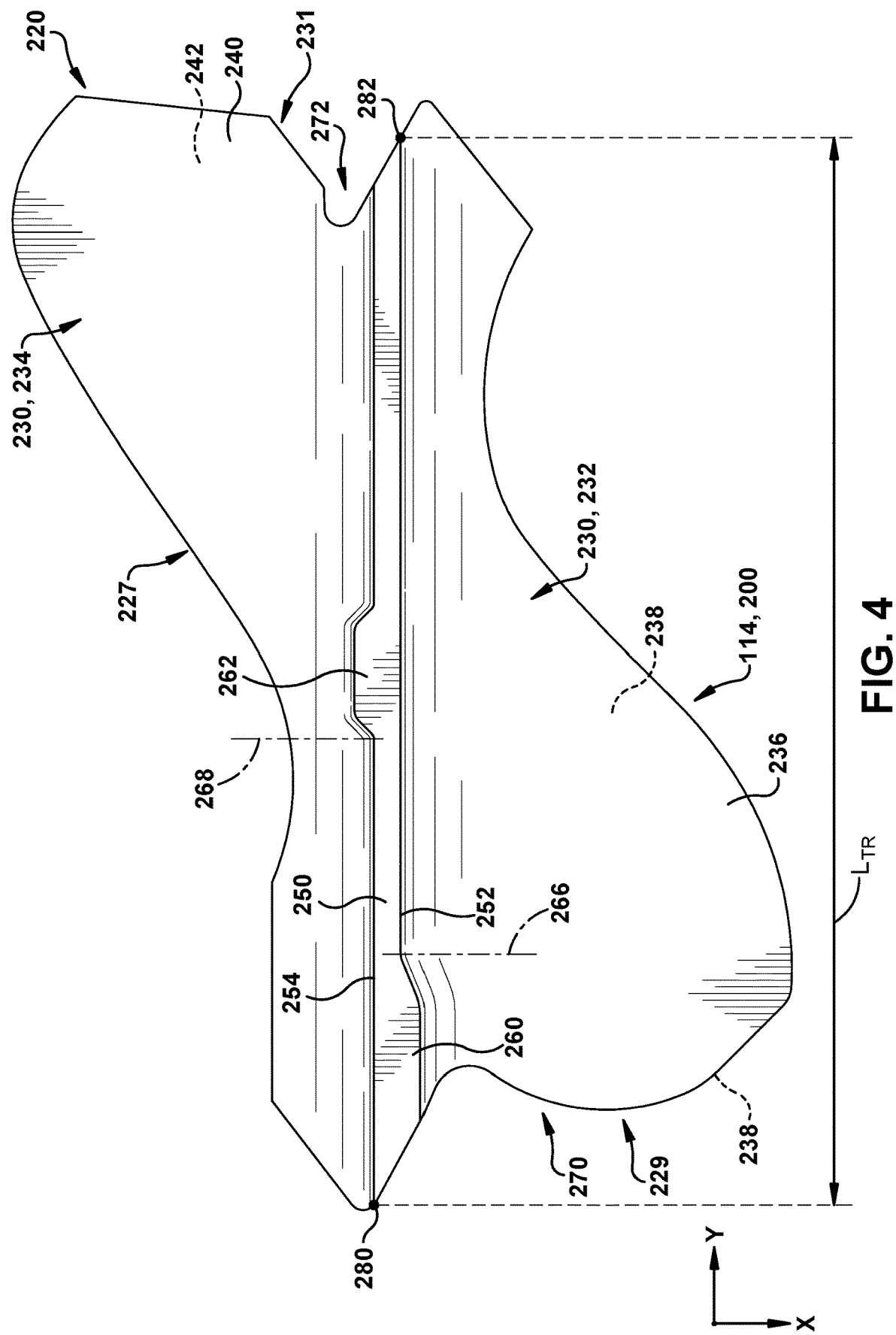
FIG. 4 shows a plan view of a tip shroud, according to various embodiments of the disclosure.

The Cartesian coordinate values are non-dimensional values of from 0% to 100% convertible to distances by multiplying the values by a particular normalizing parameter value expressed in units of distance. That is, the coordinate values in the tables are percentages of the normalized parameter, so the multiplication of the actual, desired distance of the normalized parameter renders the actual coordinates of the surface profile for a tip shroud having that actual, desired distance of the normalized parameter. As will be described further herein, the normalizing parameter may include a tip rail axial length $L_{TR}$ (FIG. 4). Hence, the actual X, Y, and perhaps Z, values of the tip rail surface profile can be rendered by multiplying values in the particular table by the actual, desired tip rail axial length $L_{TR}$ (e.g., 5.2 centimeters). In any event, the X and Y values, and Z values, where provided, are connected by lines and/or arcs to define smooth surface profiles.

Referring to the drawings, FIG. 1 is a schematic view of an illustrative turbomachine 90 in the form of a combustion turbine or gas turbine (GT) system 100 (hereinafter "GT system 100"), which may be used for electrical power generation. GT system 100 includes a compressor 102 and a combustor 104. Combustor 104 includes a combustion region 105 and a fuel nozzle assembly 106. GT system 100 also includes a turbine 108 and a common rotor compressor/turbine shaft 110 (hereinafter referred to as "rotor shaft 110"). In one non-limiting embodiment, GT system 100 may be a 9F.05 engine, commercially available from General Electric Company, Greenville, S.C. The present disclosure is not limited to any one particular GT system and may be implemented in connection with other engines including, for example, other HA, F, B, LM, GT, TM and E-class engine models of General Electric Company, and engine models of other companies. Further, the teachings of the disclosure are not necessarily applicable to only a GT system and may be applied to other types of turbomachines, e.g., steam turbines, jet engines, compressors, etc.

Figure 2:
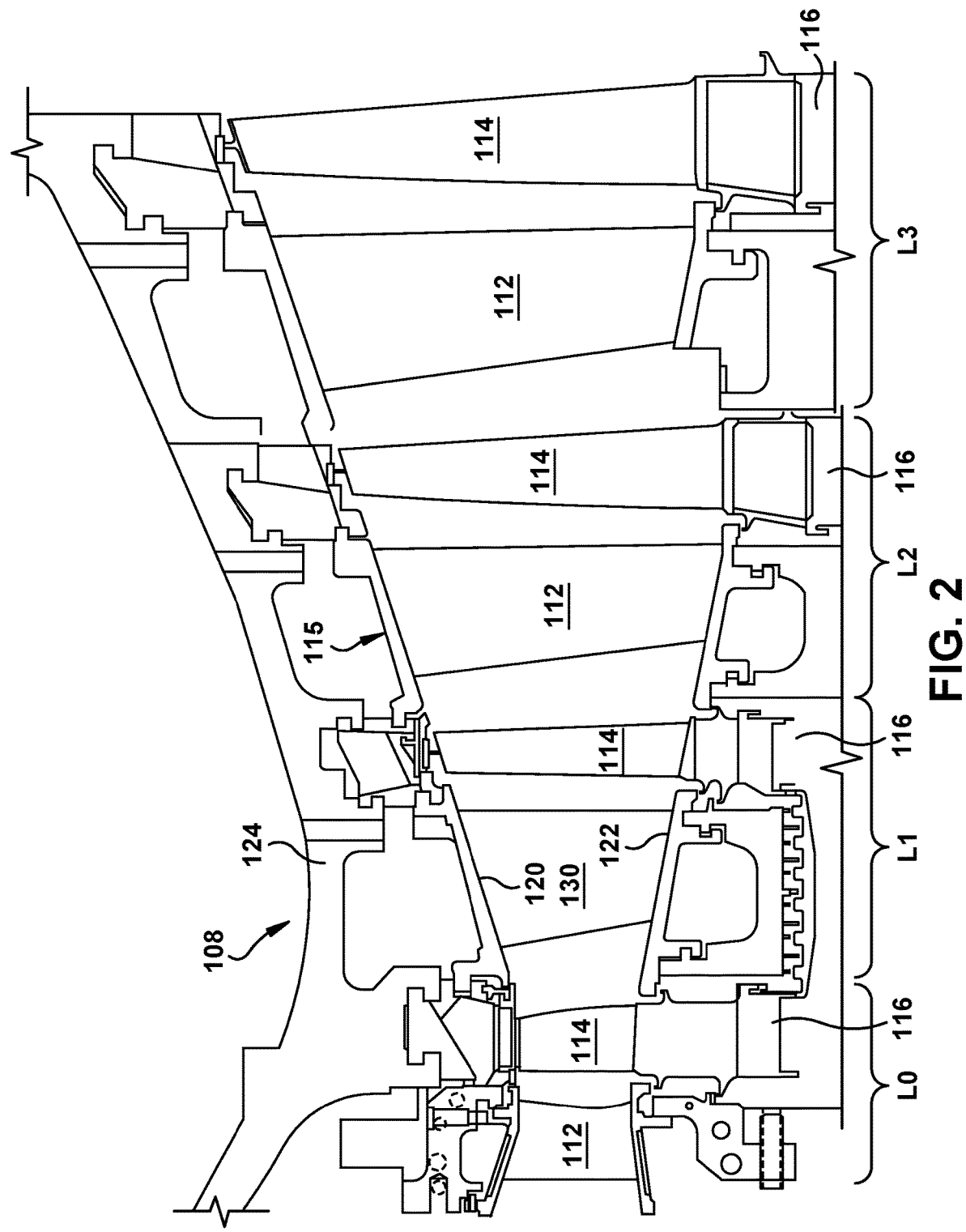
FIG. 2 shows a cross-sectional view of an illustrative gas turbine assembly with four stages that may be used with the turbomachine in FIG. 1.

FIG. 2 shows a cross-sectional view of an illustrative portion of turbine 108 with four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is the next stage in an axial direction, which is adjacent to and downstream of stage L0. Stage L2 is the third stage and is the next stage in an axial direction, which is adjacent and downstream stage L1. Stage L3 is the fourth, last stage and is the largest (in a radial direction). It is to be understood that four stages are shown as one non-limiting example only, and each turbine 108 may have more or less than four stages.

A set of stationary vanes or nozzles 112 cooperate with a set of rotating blades 114 to form each stage L0-L3 of turbine 108 and to define a portion of a flow path through turbine 108. Rotating blades 114 in each set are coupled to a respective rotor wheel 116 that couples them circumferentially to rotor shaft 110. That is, a plurality of rotating blades 114 is mechanically coupled in a circumferentially spaced manner to each rotor wheel 116. A static blade section 115 includes stationary nozzles 112 circumferentially spaced around rotor shaft 110. Each nozzle 112 may include at least one endwall (or platform) 120, 122 connected with an airfoil 130. In the example shown, nozzle 112 includes a radially outer endwall 120 and a radially inner endwall 122. Radially outer endwall 120 couples nozzle 112 to a casing 124 of turbine 108.

Referring to FIGS. 1-2, in operation, air flows through compressor 102, and compressed air is supplied to combustor 104. Specifically, the compressed air is supplied to fuel nozzle assembly 106 that is integral to combustor 104. Fuel nozzle assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 within which gas stream thermal energy is converted to mechanical rotational energy. Turbine 108 is rotatably coupled to and drives rotor shaft 110. Compressor 102 may also be rotatably coupled to rotor shaft 110. In the illustrative embodiment, there are a plurality of combustors 104 and fuel nozzle assemblies 106. In the following discussion, unless otherwise indicated, only one of each component will be discussed. At least one end of rotating rotor shaft 110 may extend axially away from either compressor 102 or turbine 108 and may be attached to a load or machinery (not shown), such as, but not limited to, a generator, a load compressor, and/or another turbine.

Figure 3:
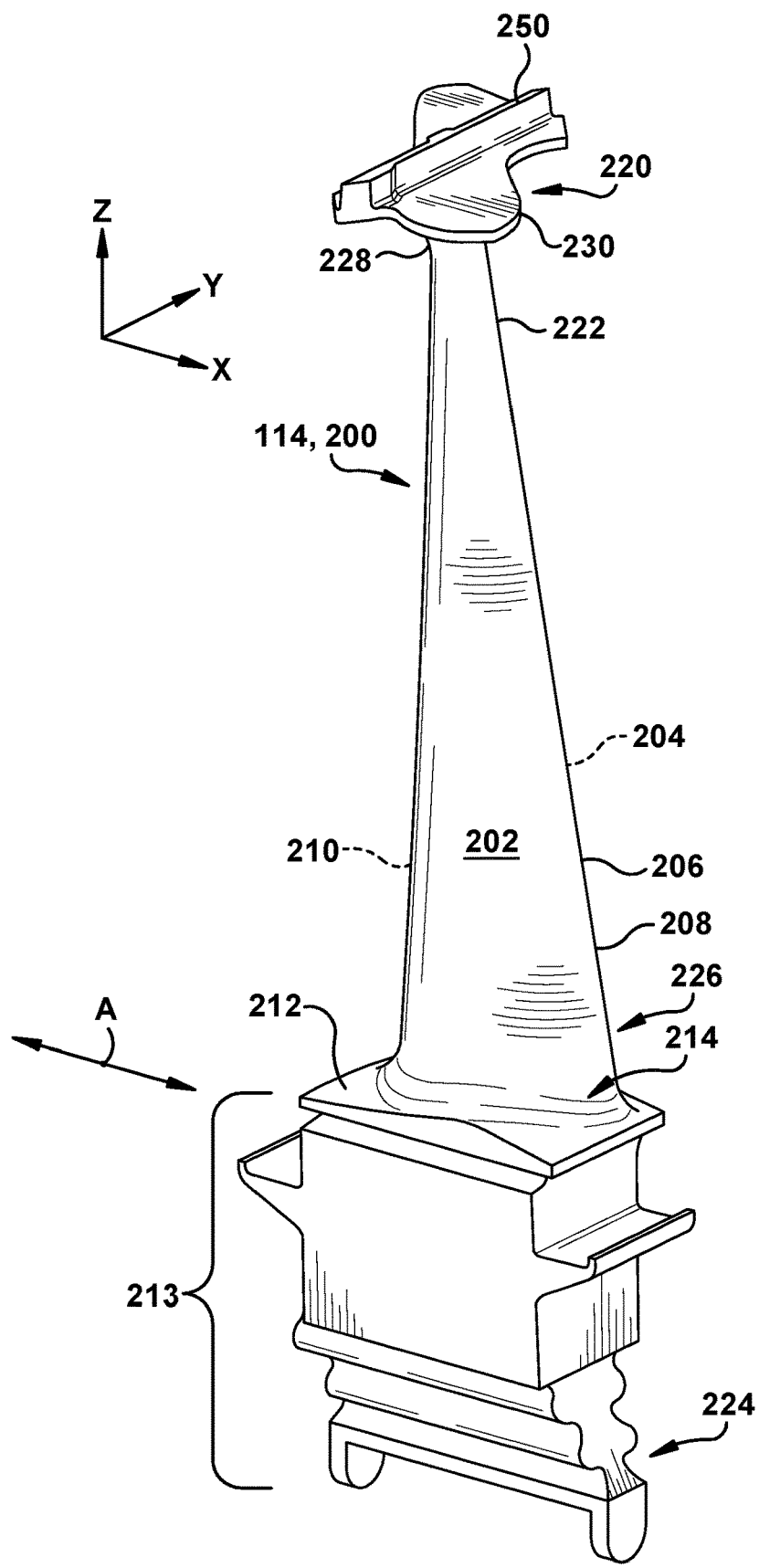
FIG. 3 shows a schematic three-dimensional view of an illustrative turbine blade including a tip shroud on a radial outer end of an airfoil, according to various embodiments of the disclosure.

FIG. 3 shows an enlarged perspective view of an illustrative turbine rotor blade 114 in detail as a blade 200. For purposes of description, a legend may be provided in the drawings in which the X-axis extends generally axially (i.e., along axis A of rotor shaft 110 (FIG. 1)), the Y-axis extends generally perpendicular to axis A of rotor shaft 110 (FIG. 1) (indicating a circumferential plane), and the Z-axis extends radially, relative to an axis A of rotor shaft 110 (FIG. 1). Relative to FIG. 3, the direction of the legend arrowheads indicate the directions of positive coordinate values.

Blade 200 is a rotatable (dynamic) blade, which may be part of the set of turbine rotor blades 114 circumferentially dispersed about rotor shaft 110 (FIG. 1) in a stage of a turbine (e.g., turbine 108). That is, during operation of a turbine, as a working fluid (e.g., gas or steam) is directed across the blade's airfoil, blade 200 will initiate rotation of a rotor shaft (e.g., rotor shaft 110) and rotate about axis A defined by rotor shaft 110. It is understood that blade 200 is configured to couple (mechanically couple via fasteners, welds, slot/grooves, etc.) with a plurality of similar or distinct blades (e.g., blades 200 or other blades) to form a set of blades in a stage of the turbine. Referring to FIG. 2, in various non-limiting embodiments, blade 200 can include a first stage (L0) blade, second stage (L1) blade, third stage (L2) blade, or fourth stage (L3) blade. In particular embodiments, blade 200 may be a third stage (L2) blade. In various embodiments, turbine 108 can include a set of blades 200 in only the first stage (L0) of turbine 108, or in only second stage (L3), or in only third stage (L2), or in only fourth stage (L3) of turbine 108.

Returning to FIG. 3, blade 200 can include an airfoil 202 having a pressure side 204 (obstructed in this view) and a suction side 206 opposing pressure side 204. Blade 200 can also include a leading edge 208 spanning between pressure side 204 and suction side 206, and a trailing edge 210 opposing leading edge 208 and spanning between pressure side 204 and suction side 206. As noted, pressure side 204 of airfoil 202 generally faces upstream, and suction side 206 generally faces downstream.

As shown, airfoil 202 of blade 200 extends from a platform at a root end 212 to a radial outer end 222. Root end 212 can connect with airfoil 202 along pressure side 204, suction side 206, leading edge 208 and trailing edge 210. More particularly, blade 200 includes airfoil 202 coupled to an endwall 213 at root end 212 and coupled to a turbine blade tip shroud 220 (hereinafter "tip shroud 220") on a tip end or radial outer end 222 thereof. Tip shroud 220 is illustrated as modified according to embodiments of the disclosure.

Endwall 213 is illustrated as including a dovetail 224 in FIG. 3, but endwall 213 can have any suitable configuration to connect to rotor shaft 110. Root end 212, via dovetail 224, is configured to fit into a mating slot (e.g., dovetail slot) in the turbine rotor shaft (e.g., rotor shaft 110) and to mate with adjacent components of other blades 200. Root end 212 is intended to be located radially inboard of airfoil 202 and to be formed in any complementary configuration to the rotor shaft.

In various embodiments, blade 200 includes a fillet 214 proximate a radially inner end 226 of airfoil 202, fillet 214 connects airfoil 202 and the platform of root end 212. Fillet 214 can include a weld or braze fillet, which may be formed via conventional MIG welding, TIG welding, brazing, etc. Fillet 214 can include such forms as integral to the investment casting process or definition.

FIG. 4 shows a plan view of a tip shroud 220, according to embodiments of the disclosure. Referring to FIGS. 3 and 4 collectively, tip shroud 220 includes a body 227 configured to couple to airfoil 202 at radial outer end 222. For example, body 227 may couple along pressure side 204, suction side 206, leading edge 208 and trailing edge 210 of airfoil 202. Body 227 has a leading edge 229 and a trailing edge 231 opposing leading edge 229.

In various embodiments, blade 200 includes a fillet 228 proximate radially outer end 222 of airfoil 202, fillet 228 connecting airfoil 202 and tip shroud 220. Fillet 228 can include a weld or braze fillet, which may be formed via conventional MIG welding, TIG welding, brazing, etc. Fillet 228 can include such forms as integral to the investment casting process or definition. In certain embodiments, fillets 214 and/or 228 can be shaped, contoured, etc., to enhance aerodynamic efficiencies.

Tip shroud 220 and, more particularly body 227, may include a pair of opposed, axially extending wings 230 configured to couple to airfoil 202 at radially outer end 222 of airfoil 202 (e.g., via fillet 228). More particularly, tip shroud 220 may include an upstream side wing 232 and a downstream side wing 234. Upstream side wing 232 extends generally circumferentially away from a tip rail 250 over pressure side 204 of airfoil 202, and downstream side wing 234 extends generally circumferentially away from tip rail 250 over suction side 206 of airfoil 202. Upstream side wing 232 includes a radial outer surface 236 facing generally radially outward from axis A of rotor shaft 110 (FIG. 1) and a radially inner surface 238 (not shown, dashed line) facing generally radially inward toward axis A of rotor shaft 110 (FIG. 1). Similarly, downstream side wing 234 includes a radial outer surface 240 facing generally radially outward from axis A of rotor shaft 110 (FIG. 1) and a radially inner surface 242 (not shown, dashed line) facing generally radially inward toward axis A of rotor shaft 110 (FIG. 1).

Tip shroud 220 includes tip rail 250 extending radially from body 227. Tip rail 250 has an upstream side 252 and a downstream side 254 opposing upstream side 252. Upstream side 252 of tip rail 250 faces generally circumferentially towards pressure side 204 of airfoil 202 and melds smoothly with radial outer surface 236 of upstream side wing 232. Similarly, downstream side 254 of tip rail 250 faces generally circumferentially towards suction side 206 of airfoil 202 and melds smoothly with radial outer surface 240 of downstream side wing 234.

Tip shroud 220 also includes a first cutter tooth 260 extending from tip rail 250 from one of upstream side 252 (as shown) and downstream side 254 of the tip rail and positioned adjacent leading edge 229 of body 227. Tip shroud 220 also includes a second cutter tooth 262 extending from tip rail 250 from the other side of upstream side 252 and downstream side 254 (as shown) of tip rail 250 at a position axially distant from first cutter tooth 260. That is, second cutter tooth 262 is spaced from first cutter tooth 260 in an axial direction (Y-direction) along tip rail 250. Hence, the cutter teeth 260, 262 are axially offset along tip rail 250. The position that is axially distant from first cutter tooth 260 may be any distance desired, e.g., to balance tip shroud 220 and/or extend the creep life of tip shroud 220. Each cutter tooth 260, 262 may include any form of protrusion of material from tip rail 250 that increases a width of tip rail 250 along a desired length. Hence, each cutter tooth 260, 262 adds mass and resistance to wear.

Figure 5:
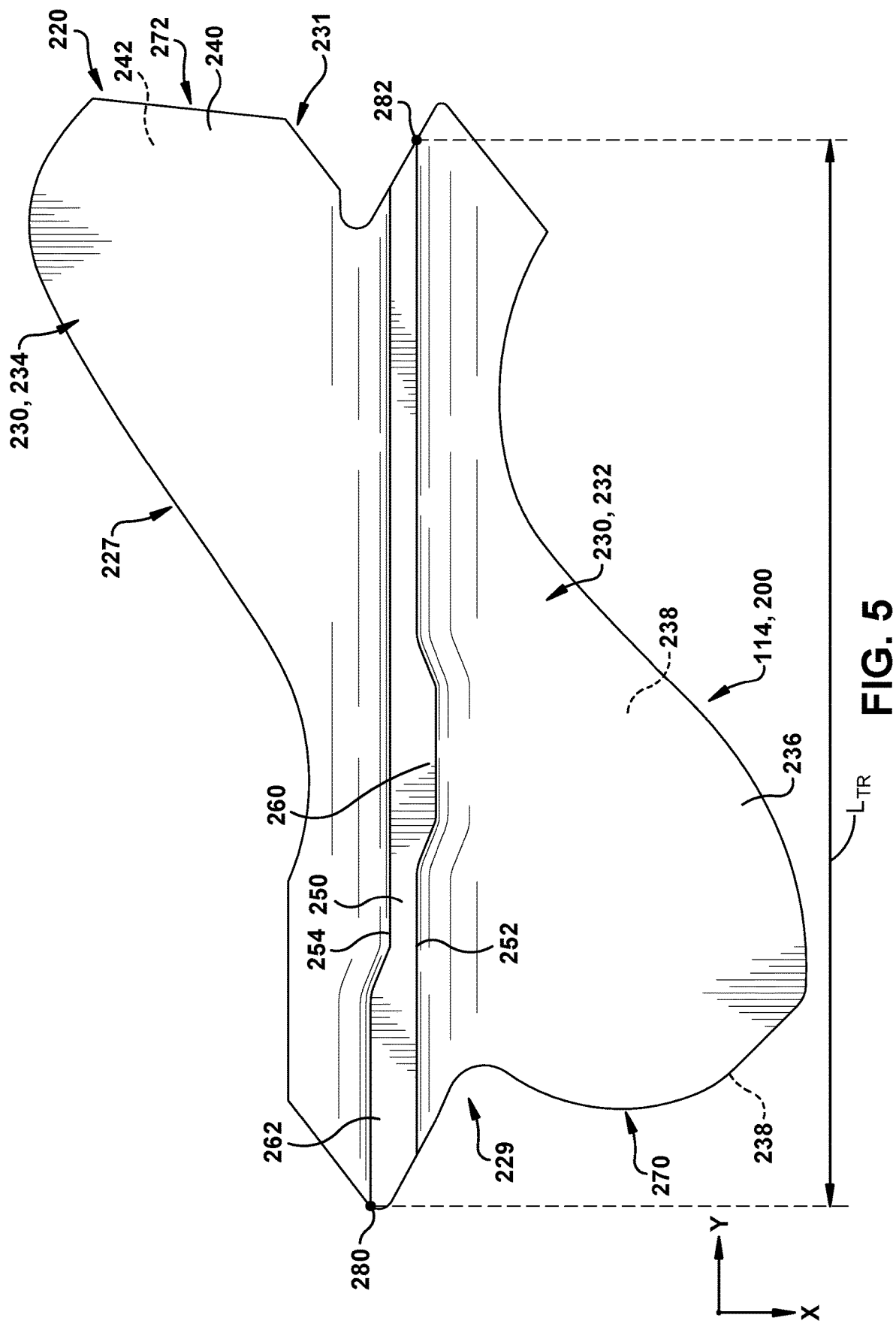
FIG. 5 shows a plan view of a tip shroud, according to other embodiments of the disclosure.

In one illustrative example, the position of second cutter tooth 262 that is axially distant from first cutter tooth 260 may be in a range of 30% to 50% of tip rail axial length $L_{TR}$. The distance between cutter teeth 260, 262 can be measured from a rearward axial end 266 of cutter tooth 260 to, for example, a forward axial end 268 of cutter tooth 262. In FIG. 4, first cutter tooth 260 extends from upstream side 252 of tip rail 250, and second cutter tooth 262 extends from downstream side 254 of tip rail 250. FIG. 5 shows an alternative embodiment in which first cutter tooth 260 extends from downstream side 254 of tip rail 250, and second cutter tooth 262 extends from upstream side 252 of tip rail 250.

Figure 6:
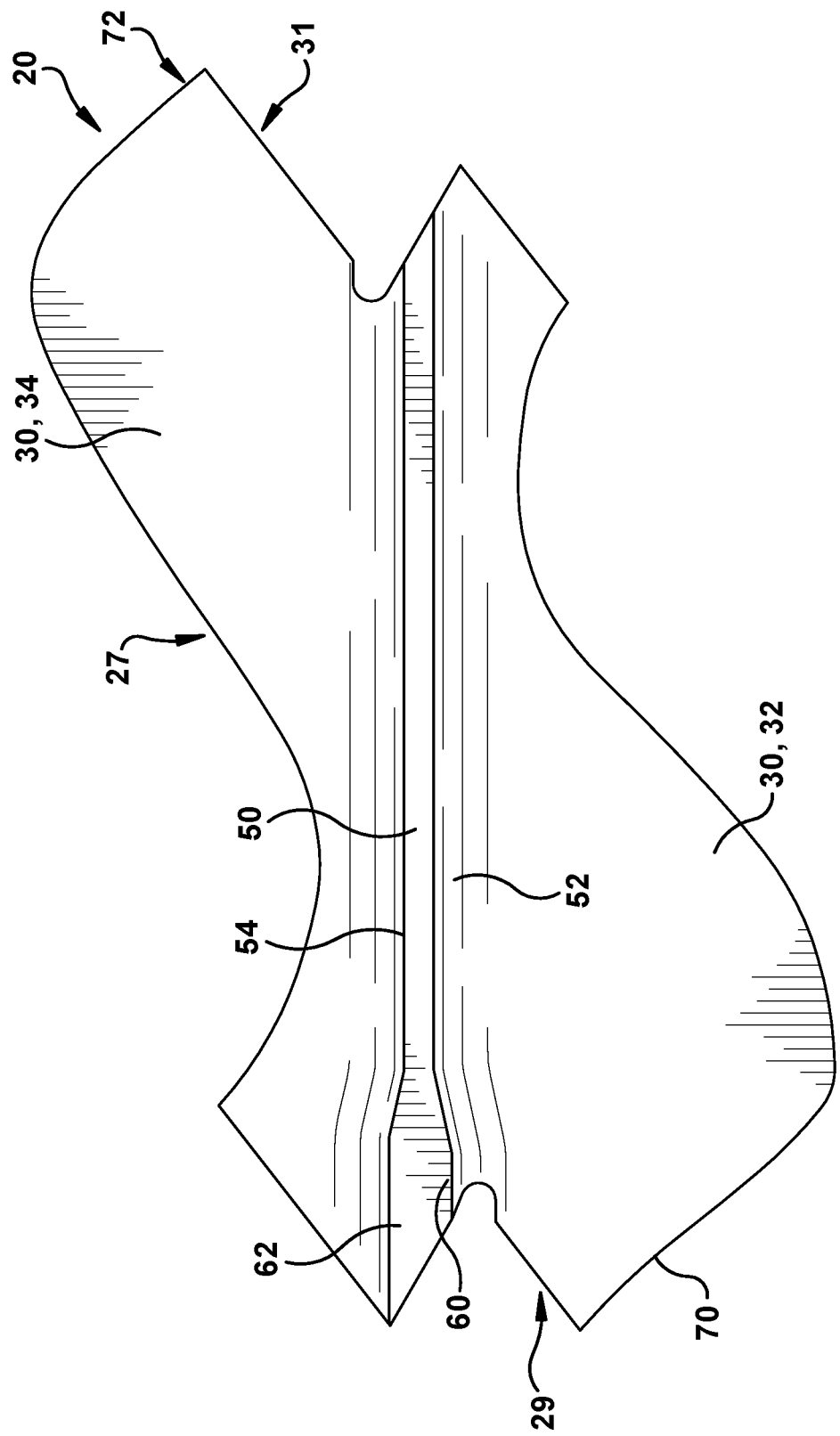
FIG. 6 shows a plan view of a prior art tip shroud to be modified, according to various embodiments of the disclosure.
Figure 7:
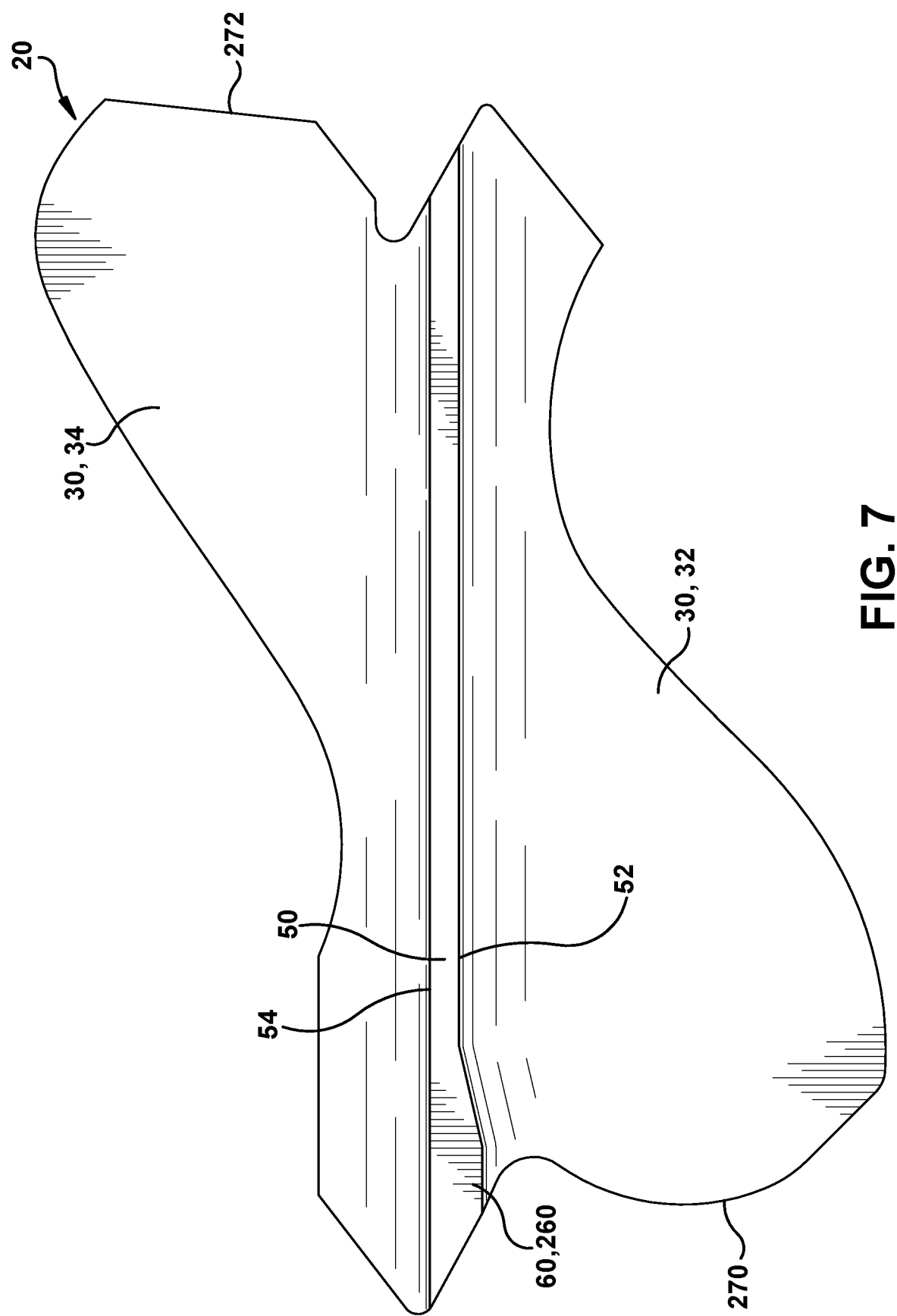
FIG. 7 shows a plan view of a tip shroud modified by removing a cutter tooth and, optionally, a portion of wing(s) of the tip shroud, according to embodiments of the disclosure.

Tip shroud 220 in FIGS. 4 and 5 can be manufactured as illustrated and described herein. In other embodiments, a tip shroud 220 can be modified from an existing tip shroud having a different arrangement of cutter teeth. Referring to FIGS. 4, 6, and 7, methods of modifying a turbine blade tip shroud will be described. FIG. 6 shows a plan view of an illustrative prior art tip shroud 20 upon which the method is applied. While a particular prior art tip shroud 20 will be described herein, it is emphasized that the teachings of the disclosure are not limited to this particular tip shroud, and they may be applied to a wide variety of currently known or later developed tip shrouds.

Tip shroud 20 includes a body 27, which may include a pair of opposed, axially extending wings 30 configured to couple to an airfoil (into page) at a radially outer end thereof. More particularly, tip shroud 20 may include an upstream side wing 32 and a downstream side wing 34. Upstream side wing 32 extends generally circumferentially away from tip rail 50 over the pressure side of the airfoil, and downstream side wing 34 extends generally circumferentially away from tip rail 50 over the suction side 206 of the airfoil (not shown).

In the example of FIG. 6, tip shroud 20 includes a tip rail 50 having cutter teeth 60, 62 opposing one another adjacent a leading edge 29 of a body 27 of tip shroud 20. A first cutter tooth 60 extends from tip rail 50 from an upstream side 52 thereof, and second cutter tooth 62 extends from tip rail 50 from downstream side 54 thereof. Hence, cutter teeth 60, 62 are opposite one another relative to tip rail 50.

Use of tip shroud 20 on a turbine blade 200 in a turbine 108 (FIG. 1) may cause the tip shroud to become imbalanced, which can shorten creep life and/or negatively affect aerodynamic performance of the tip shroud and turbine. Rather than replace turbine blade 200 or replace tip shroud 20, it has been discovered that modifying the tip shroud, and more particularly, the position of cutter teeth thereon, can return balance and extend creep life of the turbine shroud.

FIG. 7 shows a plan view of part of a method of modifying tip shroud 20. Tip shroud 20 may be modified in a number of ways. According to embodiments of the disclosure, one of cutter teeth 60, 62 may be removed from a selected side of tip rail 50. That is, tip shroud 20 may be modified by removing a selected cutter tooth 60 or 62 extending from a selected side of upstream side 52 and downstream side 54 of tip rail 50 of tip shroud 20. For purposes of description only, the selected side will be downstream side 54, and reference will be made to cutter tooth 62 as the selected cutter tooth for removal. Here, cutter tooth 62 (FIG. 6) on downstream side 54 is removed, and cutter tooth 60 on upstream side 52 remains. As will be recognized, the other cutter tooth 60 could be removed in the alternative. Cutter tooth 62 can be removed using any now known or later developed technique, e.g., machining, cutting, etc.

In addition to cutter tooth 62 removal, as observed by comparing FIGS. 6 and 7, the method may optionally include removing a portion of at least one of a pair of opposed, axially extending wings 32, 34. In one non-limiting example, the removing of the portion of wing(s) 32, 34 may include rounding an edge surface 70 (in, for example, wing 32) from a more linear edge surface profile 70 (shown in FIG. 6) to a rounded leading edge surface 270 in FIG. 7. In another non-limiting example, the removing of the portion of wing(s) 32, 34 may include forming a linear edge surface 272 (in, for example, wing 34) in place of a pointed trailing edge surface 72 of wing 34 (as shown in FIG. 6).

While particular examples of removing portions of a wing(s) 32, 34 have been illustrated, it will be recognized that wing(s) 32, 34 can be modified in a wide number of alternative ways. The removing of the portions can occur for any reason such as removing a damaged part, rebalancing of weight after use, extending creep life, improving aerodynamics, among many other reasons.

FIG. 4 shows tip shroud 220 after additional modification, according to embodiments of the disclosure. More particularly, FIG. 4 shows tip shroud 220 after forming a new cutter tooth 262 on tip shroud 20 in FIG. 7. Cutter tooth 262 is formed on the selected side of upstream side 252 and downstream side 254 (shown) of tip rail 250 opposite the remaining (first) cutter tooth 60, 260 at a position axially distant from the remaining cutter tooth, now renumbered 260. For purposes of description, in the embodiment of FIG. 4, the selected side is the downstream side 254. As a result, cutter tooth 260 (labeled 60 in FIG. 6) extends from upstream side 252 (52 in FIG. 6) of tip rail 220, and new cutter tooth 262 extends from downstream side 254 (54 in FIG. 6) of tip rail 250.

With reference to FIGS. 5 and 6, it will be recognized that in alternative embodiments, cutter tooth 60 could be removed from upstream side 52, and a new cutter tooth 260 added to upstream side 252 axially spaced from the location of cutter tooth 60. In this case, the selected side is upstream side 52.

Figure 8:
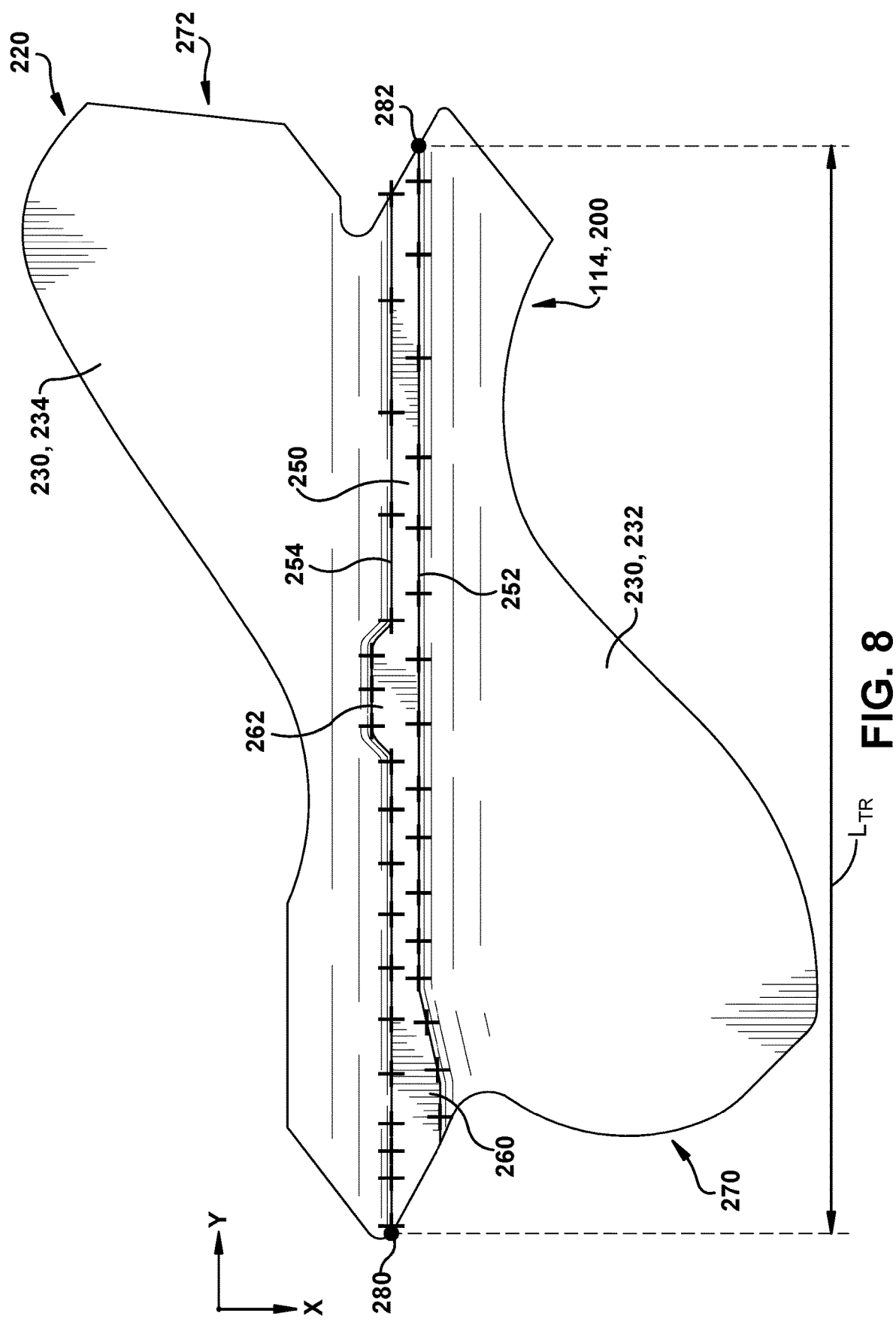
FIG. 8 shows a plan view of a tip shroud including tip rail upstream and downstream side surface profile data points, according to various embodiments of the disclosure.
Figure 9:
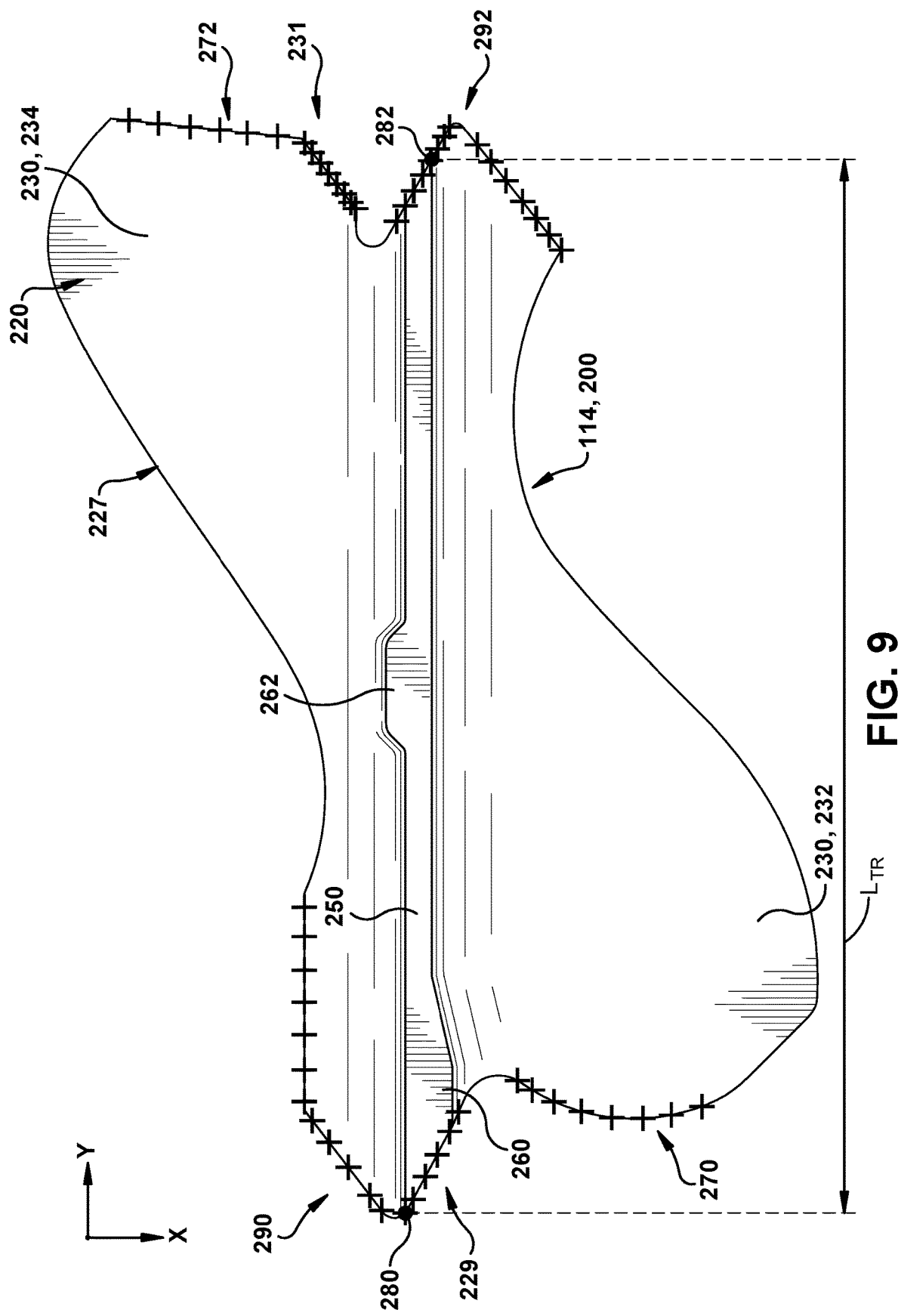
FIG. 9 shows a plan view of a tip shroud including leading edge surface and trailing edge surface profile data points, according to various embodiments of the disclosure.

FIGS. 8 and 9 show plan views of tip shroud 220 with sets of data points that define certain surface profiles superimposed thereon. Data points illustrated in the drawings are schematically represented and may not match data points in the tables, described hereafter. As shown in FIGS. 4-5, 8, and 9, tip rail 250 also includes a forward-most and radially outermost origin (point) 280 at an axially forward end thereof and a rearward-most and radially outermost origin (point) 282 at an axially rearward end thereof. Forward-most and radially outermost origins 280, 282 may act as an origin for certain surface profiles described herein. As shown in FIGS. 4, 5, 8, and 9, a "tip rail axial length $L_{TR}$" is a distance between forward-most and radially outermost origin 280 and rearward-most and radially outermost origin 282.

Referring to FIGS. 8 and 9, various surface profiles of tip shroud 220 according to embodiments of the disclosure will now be described. The surface profiles are each identified in the form of X, Y coordinates, and perhaps also Z coordinates, listed in TABLES I and II. The X, Y, and Z coordinate values in TABLES I-II have been expressed in normalized or non-dimensionalized form in values of from 0% to 100%, but it should be apparent that any or all of the values could instead be expressed in distance units so long as the percentages and proportions are maintained. To convert X, Y, Z values of either TABLE I-II to actual respective X, Y or Z coordinate values from the relevant origin (e.g., origin 280 on tip rail 250) in units of distance, such as inches or meters, the non-dimensional values given in TABLE I-II can be multiplied by a normalization parameter value. As noted, the normalization parameter used herein is tip rail axial length $L_{TR}$. In any event, by connecting the actual X, Y, Z values with smooth continuing arcs or lines, depending on the surface profile, each surface profile can be ascertained, thus forming the various nominal tip shroud surface profiles.

The values in TABLES I-II are non-dimensionalized values generated and shown to three decimal places for determining the various nominal surface profiles of tip shroud 220 at ambient, non-operating, or non-hot conditions, and do not take any coatings into account, though embodiments could account for other conditions and/or coatings. To allow for typical manufacturing tolerances and/or coating thicknesses, ±values can be added to the values listed in TABLE I-II. In one embodiment, a tolerance of about 10-20 percent can be applied. For example, a tolerance of about 10-20 percent applied to an X coordinate of a tip rail surface profile can define the surface profile range at cold or room temperature. The tip shroud surface profile, as embodied herein, is robust to this range of variation without impairment of mechanical and aerodynamic functions.

The surface profiles can be scaled larger or smaller, such as geometrically, without impairment of operation. Such scaling can be facilitated by multiplying the normalized/non-dimensionalized values by a common scaling factor (i.e., the actual, desired distance of the normalization parameter), which may be a larger or smaller number of distance units than might have originally been used for a tip shroud, e.g., of a given tip rail axial length, as appropriate. For example, the non-dimensionalized values in TABLE I could be multiplied uniformly by a scaling factor of 2, 0.5, or any other desired scaling factor of the relevant normalized parameter. In various embodiments, the X, Y, and Z distances are scalable as a function of the same constant or number (e.g., tip rail axial length $L_{TR}$) to provide a scaled up or scaled down tip shroud. Alternatively, the values could be multiplied by a larger or smaller desired constant.

While the Cartesian values in TABLE I-II provide coordinate values at predetermined locations, only a portion of Cartesian coordinate values set forth in each table may be employed. In one non-limiting example, with reference to FIG. 8, the profile of tip rail side surfaces may use a portion of X and Y coordinate values defined in TABLE I, e.g., from points 5 to 16. Any portion of Cartesian coordinate values of X, Y, and Z set forth in TABLES I-II may be employed.

FIG. 8 shows a number of X and Y coordinate points that define a tip rail side surfaces profile, including at least portions of upstream side 252 and downstream side 254. In this embodiment, sides 252, 254 of tip rail 250 have a shape having a nominal profile substantially in accordance with at least part of Cartesian coordinate values of X and Y set forth in TABLE I (below) and originating at forward-most and radially outermost origin 280. The Cartesian coordinate values are non-dimensional values of from 0% to 100% convertible to distances by multiplying the X and Y, by tip rail axial length $L_{TR}$, expressed in units of distance. Here again, the normalization parameter for the X and Y coordinates is tip rail axial length $L_{TR}$ of tip rail 250. When scaling up or down, the X and Y coordinate values in TABLE I can be multiplied by the desired tip rail axial length $L_{TR}$ of tip rail 250 to identify the corresponding actual X and Y coordinate values of the tip shroud side surfaces profile. Collectively, the actual X and Y coordinate values created identify the tip rail side surfaces profile, according to embodiments of the disclosure, at any desired size of tip shroud. As shown in FIG. 8, X and Y values may be connected by lines to define the tip rail side surfaces profile.

TABLE I

Tip Rail Side Surfaces Profile [non-dimensionalized values]

| | X | Y |
|---|---|---|
| Downstream Side: | | |
| 1 | 0.0000 | 0.0000 |
| 2 | 0.1230 | 0.0506 |
| 3 | 0.2050 | 0.0750 |
| 4 | 0.2050 | 0.1012 |
| 5 | 0.1905 | 0.1518 |
| 6 | 0.1350 | 0.2024 |
| 7 | 0.1089 | 0.2530 |
| 8 | 0.1089 | 0.3036 |
| 9 | 0.1089 | 0.3543 |
| 10 | 0.1089 | 0.4049 |
| 11 | 0.1089 | 0.4555 |
| 12 | −0.0947 | 0.4888 |
| 13 | −0.0947 | 0.5221 |
| 14 | −0.0947 | 0.5555 |
| 15 | 0.1089 | 0.5888 |
| 16 | 0.1089 | 0.6916 |
| 17 | 0.1089 | 0.7944 |
| 18 | 0.1089 | 0.8972 |
| 19 | 0.1089 | 1.0000 |
| Upstream Side: | | |
| 20 | 0.2059 | 0.0757 |
| 21 | 0.2059 | 0.1029 |
| 22 | 0.2059 | 0.1302 |
| 23 | 0.1997 | 0.1386 |
| 24 | 0.1831 | 0.1535 |
| 25 | 0.1666 | 0.1684 |
| 26 | 0.1501 | 0.1833 |
| 27 | 0.1336 | 0.1983 |
| 28 | 0.1171 | 0.2132 |
| 29 | 0.1124 | 0.2216 |
| 30 | 0.1109 | 0.3081 |
| 31 | 0.1109 | 0.3946 |
| 32 | 0.1109 | 0.4811 |
| 33 | 0.1109 | 0.5676 |
| 34 | 0.6541 | 0.1109 |
| 35 | 0.7406 | 0.1109 |
| 36 | 0.8270 | 0.1109 |
| 37 | 0.9135 | 0.1109 |
| 38 | 1.0000 | 0.1109 |

In another embodiment, tip shroud 220 may also include leading edge surface and trailing edge surface profiles, as described herein relative to TABLE II. FIG. 9 shows a plan view of tip shroud 220 illustrating data points of a leading edge surface 290 and a trailing edge surface 292. As understood in the field, leading edge surfaces 290 and trailing edge surfaces 292 of adjacent tip shrouds 220 on adjacent blades 200 (FIG. 3) mate to collectively define a radially inner surface for a hot gas path in turbine 108 (FIG. 1), e.g., via wings 230, 234.

Leading edge surface 290 and trailing edge surface 292 can have a shape having a nominal profile substantially in accordance with at least part of Cartesian coordinate values of X, Y, Z values set forth in TABLE II (below) and originating at forward-most and radially outermost origin 280. The Cartesian coordinate values are non-dimensional values of from 0% to 100% convertible to distances by multiplying the values by tip rail axial length $L_{TR}$. That is, the normalization parameter for the X, Y, and Z coordinates are the same: tip rail axial length $L_{TR}$. When scaling up or down, the X, Y, Z coordinate values in TABLE II can be multiplied by the actual, desired tip rail axial length $L_{TR}$ to identify the corresponding actual X, Y, Z coordinate values of the leading and trailing edge surfaces profile. The actual X and Y coordinate values can be joined smoothly with one another to form the leading edge surface profile and trailing edge surface profile.

TABLE II

Leading Edge Surface and Trailing Edge Surface Profiles [non-dimensionalized values]

| | X | Y | Z |
|---|---|---|---|
| Leading Edge: | | | |
| 1 | −0.035 | 0.001 | −0.927 |
| 2 | −0.118 | 0.001 | −0.906 |
| 3 | 0.023 | 0.021 | −0.938 |
| 4 | −0.205 | 0.024 | −0.880 |
| 5 | 0.081 | 0.041 | −0.949 |
| 6 | −0.292 | 0.046 | −0.853 |
| 7 | 0.139 | 0.062 | −0.960 |
| 8 | −0.379 | 0.068 | −0.827 |
| 9 | 1.055 | 0.082 | −1.189 |
| 10 | 0.196 | 0.082 | −0.971 |
| 11 | 1.191 | 0.084 | −1.224 |
| 12 | 0.919 | 0.085 | −1.154 |
| 13 | 0.786 | 0.090 | −1.120 |
| 14 | −0.466 | 0.090 | −0.801 |
| 15 | −0.466 | 0.090 | −0.801 |
| 16 | 1.324 | 0.091 | −1.256 |
| 17 | 0.656 | 0.099 | −1.085 |
| 18 | 0.537 | 0.113 | −1.053 |
| 19 | −0.466 | 0.121 | −0.796 |
| 20 | −0.466 | 0.152 | −0.792 |
| 21 | −0.466 | 0.182 | −0.788 |
| 22 | −0.466 | 0.213 | −0.784 |
| 23 | −0.466 | 0.244 | −0.780 |
| 24 | −0.466 | 0.274 | −0.777 |
| Trailing Edge: | | | |
| 25 | 0.688 | 0.885 | −1.081 |
| 26 | 0.622 | 0.902 | −1.066 |
| 27 | −0.019 | 0.909 | −0.904 |
| 28 | 0.556 | 0.919 | −1.052 |
| 29 | 0.019 | 0.922 | −0.916 |
| 30 | −0.250 | 0.923 | −0.848 |
| 31 | −0.286 | 0.933 | −0.840 |
| 32 | 0.057 | 0.936 | −0.927 |
| 33 | 0.489 | 0.936 | −1.037 |
| 34 | −0.322 | 0.942 | −0.832 |
| 35 | 0.094 | 0.949 | −0.939 |
| 36 | −0.358 | 0.952 | −0.824 |
| 37 | 0.423 | 0.953 | −1.023 |
| 38 | −0.394 | 0.961 | −0.817 |
| 39 | 0.132 | 0.962 | −0.951 |
| 40 | −0.430 | 0.970 | −0.809 |
| 41 | 0.357 | 0.970 | −1.009 |
| 42 | 0.975 | 0.170 | −0.962 |
| 43 | 0.980 | −0.466 | −0.801 |
| 44 | 0.980 | −0.466 | −0.801 |
| 45 | 0.983 | −0.604 | −0.767 |
| 46 | 0.986 | −0.741 | −0.733 |
| 47 | 0.987 | 0.291 | −0.995 |
| 48 | 0.989 | 0.208 | −0.974 |
| 49 | 0.990 | −0.878 | −0.698 |
| 50 | 0.993 | −1.015 | −0.664 |
| 51 | 0.997 | −1.153 | −0.630 |
| 52 | 1.000 | −1.290 | −0.595 |

Other embodiments of the disclosure may include any combination of surface profiles described herein. That is, the surface profiles of TABLE I can be used with the surface profiles of TABLE II, and vice versa.

The [X, Y, Z] data points in the respective TABLES may be joined smoothly with one another (with lines and/or arcs) to form a surface profile for the respective tip rail upstream side, tip rail downstream sides, tip shroud leading edge and/or tip shroud trailing edge, using any now known or later developed curve fitting technique generating a curved surface appropriate for a tip shroud. Curve fitting techniques may include but are not limited to: extrapolation, interpolation, smoothing, polynomial regression, and/or other mathematical curve fitting functions. The curve fitting technique may be performed manually and/or computationally, e.g., through statistical and/or numerical-analysis software.

The disclosed surface profiles provide unique shapes to achieve, for example: improved turbine longevity and reliability by rebalancing to address creep or other wear; and/or normalized aerodynamic and mechanical blade or tip shroud loadings. The disclosed loci of points defined in TABLES I-II allow GT system 100 or any other suitable turbine system to run in an efficient, safe, and smooth manner. As also noted, any scale of tip shroud 220 may be adopted as long as: interaction between other stages of turbine 108 (FIG. 1); aerodynamic efficiency; and normalized aerodynamic and mechanical blade or airfoil loadings, are maintained in the scaled turbine.

Tip shroud 220 surface profile(s) and axially offset cutter teeth 260, 262 described herein improve overall GT system 100 reliability and efficiency. Tip shroud 220 surface profile(s) also meet all aeromechanical and stress requirements.

The apparatus and devices of the present disclosure are not limited to any one particular turbomachine, engine, turbine, jet engine, power generation system or other system, and may be used with turbomachines such as aircraft systems, power generation systems (e.g., simple cycle, combined cycle), and/or other systems (e.g., nuclear reactor). Additionally, the apparatus of the present disclosure may be used with other systems not described herein that may benefit from the increased efficiency of the apparatus and devices described herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

We claim:

1. A method of modifying a turbine blade tip shroud, the method comprising:

removing a first cutter tooth extending from a selected side of an upstream side and a downstream side of a tip rail of the turbine blade tip shroud, the first cutter tooth opposing a second cutter tooth extending from the tip rail from the other side of the upstream side and the downstream side of the tip rail, wherein the first cutter tooth and the second cutter tooth are adjacent a leading edge of a body of the turbine blade tip shroud, and wherein the second cutter tooth remains adjacent the leading edge of the body of the turbine blade tip shroud; and forming a third cutter tooth on the selected side of the upstream side and the downstream side of the tip rail at a position axially distant from the second cutter tooth such that an axial distance from a rearward axial end of the second cutter tooth to a forward axial end of the third cutter tooth is at least 30% of an axial length of the tip rail, wherein the forming of the third cutter tooth occurs after the removing of the first cutter tooth, such that the turbine blade tip shroud, as modified, includes the third cutter tooth on the selected side of the tip rail and the second cutter tooth on the other side of the tip rail opposite the selected side.

2. The method of claim 1, wherein the second cutter tooth extends from the upstream side of the tip rail, and the third cutter tooth extends from the downstream side of the tip rail.

3. The method of claim 1, wherein the axial distance from the rearward axial end of the second cutter tooth to the forward axial end of the third cutter tooth is in a range of 30% to 50% of the axial length of the tip rail.

4. The method of claim 1, wherein the body of the turbine blade tip shroud includes a pair of opposed, axially extending wings, and further comprising removing a portion of at least one of the pair of opposed, axially extending wings.

5. The method of claim 4, wherein the removing the portion of the at least one of the pair of opposed, axially extending wings includes rounding an edge surface thereof from a more linear edge surface profile.

6. The method of claim 4, wherein the removing the portion of the at least one of the pair of opposed, axially extending wings includes forming a linear edge surface.

* * * * *